US008789921B2

(12) United States Patent
Izoe (10) Patent No.: US 8,789,921 B2
(45) Date of Patent: Jul. 29, 2014

(54) PRINTING DEVICE FOR SELECTING ONE OF A PLURALITY OF PRINT METHODS

(75) Inventor: Shintaro Izoe, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 331 days.

(21) Appl. No.: 13/434,784

(22) Filed: Mar. 29, 2012

(65) Prior Publication Data

US 2013/0003082 A1 Jan. 3, 2013

(30) Foreign Application Priority Data

Jun. 30, 2011 (JP) ................................ 2011-145620

(51) Int. Cl.
*B41J 29/38* (2006.01)

(52) U.S. Cl.
USPC .............................................. 347/41; 347/37

(58) Field of Classification Search
CPC ...... B41J 2/2132; B41J 2/5056; B41J 2/2135; B41J 29/38
USPC .................... 347/9–12, 14, 15, 37, 40, 41, 43
See application file for complete search history.

(56) References Cited

U.S. PATENT DOCUMENTS

| 5,079,563 | A * | 1/1992 | Starkweather et al. ......... 347/41 |
| 5,988,790 | A | 11/1999 | Koike et al. |
| 6,250,734 | B1 | 6/2001 | Otsuki |
| 6,260,946 | B1 | 7/2001 | Hori |
| 6,595,619 | B2 | 7/2003 | Barinaga et al. |
| 6,744,530 | B1 | 6/2004 | Someno et al. |
| 6,883,898 | B2 * | 4/2005 | Sato ................................ 347/40 |
| 7,520,583 | B2 | 4/2009 | Arazaki et al. |
| 7,988,251 | B2 | 8/2011 | Dimitrijevic et al. |
| 2002/0063873 | A1 | 5/2002 | Kakutani et al. |
| 2004/0080551 | A1 | 4/2004 | Nunokawa |
| 2008/0284808 | A1 | 11/2008 | Kano et al. |
| 2008/0298827 | A1 | 12/2008 | Akiyama et al. |
| 2010/0165032 | A1 | 7/2010 | Yoshida |
| 2013/0002745 | A1 | 1/2013 | Izoe |
| 2013/0002760 | A1 | 1/2013 | Izoe |

FOREIGN PATENT DOCUMENTS

| JP | H09-277601 A | 10/1997 |
| JP | H11-207945 A | 8/1999 |
| JP | H11-286102 A | 10/1999 |
| JP | 2003-226002 A | 8/2003 |
| JP | 2004-216615 A | 8/2004 |
| JP | 2005-349638 A | 12/2005 |

OTHER PUBLICATIONS

Japan Patent Office, Machine translation of JP 2004-216615 A. (Reference cited in IDS filed on Mar. 29, 2012).

* cited by examiner

*Primary Examiner* — Thinh Nguyen
(74) *Attorney, Agent, or Firm* — Baker Botts L.L.P.

(57) ABSTRACT

In a printing device, includes a print head, a scanning portion, a head drive portion, and a print control processor. The print control processor is configured to function as a property data acquiring unit and a print method selecting unit. The property data acquiring unit is configured to acquire property data with respect to a property of the scan. The print method selecting unit is configured to select, based on the property data, one of a plurality of print methods, each of the plurality of print method printing, in a prescribed order, the plurality of raster lines arranged in the first direction by the line pitch. The prescribed order is specific to each of the plurality of print methods. The print control processor is configured to perform the print operation in the resolution by using the selected one of the plurality of methods.

9 Claims, 8 Drawing Sheets

PRINTING DEVICE FOR SELECTING ONE OF A PLURALITY OF PRINT METHODS

CROSS REFERENCE TO RELATED APPLICATION

This application claims priority from Japanese Patent Application No. 2011-145620 filed Jun. 30, 2011. The entire content of the priority application is incorporated herein by reference.

TECHNICAL FIELD

The invention relates to a printing device capable of reducing defects in images formed through interlaced printing.

BACKGROUND

Printing devices that print images by forming dots on a print medium are in widespread use. Some such printing devices employ an interlaced printing method known in the art in which dots are formed on adjacent main scanning lines in different main scans. Using interlaced printing, a printing device can print at a higher resolution, whereby the pitch of dots in the sub-scanning direction (the line spacing of adjacent main scanning lines) is smaller than the nozzle pitch in the sub-scanning direction. There is also a well-known technique for reducing banding and other defects in image quality by forming dots in the same main scanning line using a plurality of main scans (hereinafter also referred to as "shingling").

In another technique known in the art, a storage unit storing information on a suitable method of shingling is mounted in the core of roll paper. Before printing on the roll paper according to a shingling method, the printing device reads this information from the storage unit to determine the method of shingling best suited to this type of roll paper. Consequently, the printing device can perform shingling that is best suited to the type of paper being used by varying the number of main scans used to form dots in each main scanning line based on the type of paper, for example.

SUMMARY

However, the conventional technology described above does not give sufficient consideration for interlaced printing. Accordingly, the image quality may suffer when performing interlaced printing on the conventional device due to differences in paper-conveying properties among different types of paper. This drop in image quality may be caused not only by differences in paper-conveying properties, but also differences in scanning properties affecting how the print head moves relative to the print medium in a direction orthogonal to the raster lines.

The primary advantage of the invention is the ability to provide an interlaced printing technique capable of reducing defects in image quality caused by properties related to scanning.

In order to attain the above and other objects, the invention provides a printing device. The printing device includes a print head, a scanning portion, a head drive portion, and a print control processor. The print head includes a plurality of nozzles arranged in a first direction and spaced apart by a prescribed nozzle pitch. The plurality of nozzles is configured to form dots having a same color on a recording sheet. The scanning portion is configured to perform a scan in which the scanning portion moves the print head relative to the recording sheet in the first direction. The head drive portion is configured to drive at least one nozzle of the plurality of nozzles to form dots such that a raster line configured of the dots extends in a second direction different from the first direction. The print control processor is configured to perform a print operation in a resolution in which a plurality of raster lines is arranged in the first direction by a line pitch smaller than the nozzle pitch by controlling the print head, the scanning portion, and the head drive portion. The print control processor is configured to function as a property data acquiring unit and a print method selecting unit. The property data acquiring unit is configured to acquire property data with respect to a property of the scan. The print method selecting unit is configured to select, based on the property data, one of a plurality of print methods, each of the plurality of print method printing, in a prescribed order, the plurality of raster lines arranged in the first direction by the line pitch, the prescribed order being specific to each of the plurality of print methods. The print control processor is configured to perform the print operation in the resolution by using the selected one of the plurality of methods.

According to another aspect, the invention provides a method for setting a printing device including: a print head including a plurality of nozzles arranged in a first direction, spaced apart by a prescribed nozzle pitch, and configured to form dots having a same color on a recording sheet; and a scanning portion configured to perform a scan in which the scanning portion moves the print head relative to the recording sheet in the first direction; and a head drive portion configured to drive at least one nozzle of the plurality of nozzles to form dots such that a raster line configured of the dots extends in a second direction different from the first direction. The printing device is configured to repeatedly perform a unit print such that the print drive portion drives the at least one nozzle to form at least one raster line and the scan in which the scanning portion moves the print head relative to the recording sheet in the first direction. The method includes (a) acquiring property data with respect to a property of the scan; and (b) selecting, based on the property data, one of a plurality of print methods that print, in a prescribed order, a plurality of raster lines arranged in the first direction by the line pitch, the prescribed order being specific to each of the plurality of print methods.

BRIEF DESCRIPTION OF THE DRAWINGS

In drawings:

FIG. 2(b) is a schematic diagram illustrating a structure of a print head when viewed from a bottom in FIG. 2(a);

FIGS. 5(b) is an explanation diagram illustrating a 8n−3;

FIG. 7(*a*) is an explanation diagram showing results of printing a measurement chart;

FIGS. 7(*b*)-7(*e*) are sample graphs in which the measured line spacing Dm is plotted in relation to positions on the paper P, where FIG. 7(*b*) shows a case where an average measured conveying distance Lmave is greater than a reference conveying distance La and a lower bound Lb is smaller than or equal to the reference conveying distance La, FIG. 7(*c*) shows a case where the lower bound Lb is greater than the reference conveying distance La, FIG. 7(*d*) shows a case where the average measured conveying distance Lmave is smaller than or equal to the reference conveying distance La and the upper bound Lu is greater than or equal to the reference conveying distance La, and FIG. 7(*e*) shows a case where the upper bound Lu is smaller than the reference conveying distance La;

DETAILED DESCRIPTION

A. First Embodiment
A-1. Structure of a Printing Device

Figure 1:
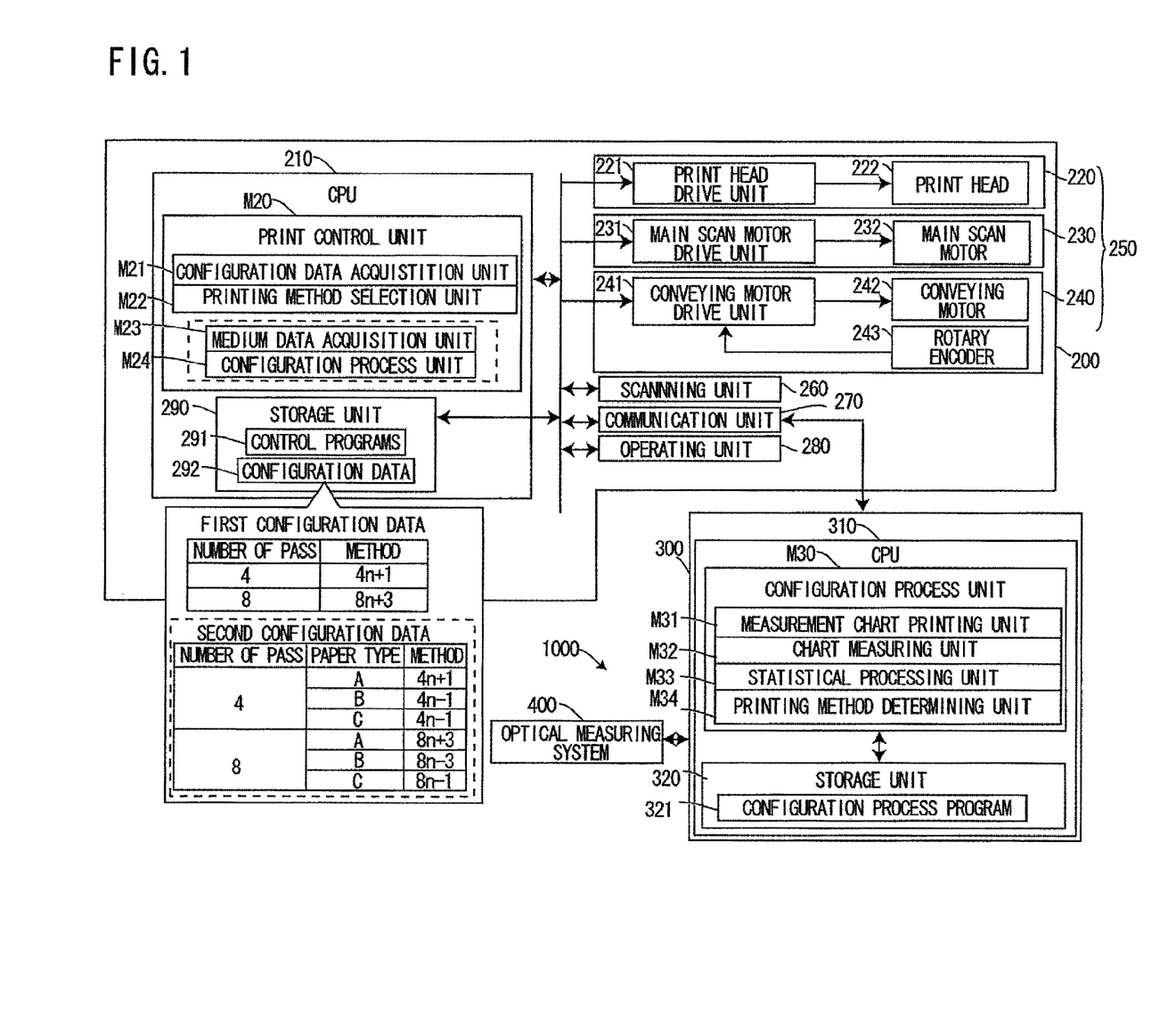
FIG. 1 is a block diagram showing a structures of a multi-function peripheral (MFP) according to a first embodiment, and a configuration system for configuring settings on the MFP.

Next, embodiments of the invention will be described. FIG. 1 is a block diagram showing the structures of a multifunction peripheral (MFP) 200 according to a first embodiment, and a configuration system 1000 for configuring settings on the MFP 200.

The MFP 200 includes a CPU 210, an inkjet printing unit 250; a flatbed scanning unit 260; a communication unit 270 provided with an interface for connecting to a personal computer or other type of computer, or an external storage device such as USB memory; an operating unit 280 having a control panel and various buttons; and a storage unit 290 including RAM, ROM, and a hard disk. The communication unit 270 can carry out data communications with the computer or the external storage device connected to the interface of the communication unit 270.

The storage unit 290 stores control programs 291, and configuration data 292. By executing the control programs 291, the CPU 210 functions as the control unit of the MFP 200. FIG. 1 selectively shows functional units relevant to the following description from among the functional units that make up the control unit of the MFP 200. Specifically, the CPU 210 functions as a print control unit M20 for controlling the inkjet printing unit 250 to execute printing operations. The print control unit M20 includes a configuration data acquisition unit M21, and a printing method selection unit M22. The configuration data acquisition unit M21 acquires the configuration data 292 (Configuration Data 1 in FIG. 1) from the storage unit 290. The printing method selection unit M22 references the configuration data 292 to select a printing method to be used for interlaced printing. The print control unit M20 executes a printing operation using the selected method of interlaced printing.

As indicated by a dotted line in FIG. 1, the print control unit M20 may further include a medium data acquisition unit M23, and a configuration process unit M24. The process performed by the medium data acquisition unit M23 will be described in a second embodiment, while the process performed by the configuration process unit M24 will be described in the variations of the embodiments.

The inkjet printing unit 250 performs printing operations by ejecting ink in the colors cyan (C), magenta (M), yellow (Y), and black (K). The inkjet printing unit 250 includes an ink ejection mechanism 220, a main scan mechanism 230, and a conveyance mechanism 240. The conveyance mechanism 240 includes a conveying motor 242, a conveying motor drive unit 241 for driving the conveying motor 242, and a rotary encoder 243. The conveyance mechanism 240 functions to convey a recording medium using the drive force of the conveying motor 242. The ink ejection mechanism 220 includes a print head 222 having a plurality of nozzles (described later), and a print head drive unit 221 for driving at least a portion of the nozzles. The ink ejection mechanism 220 forms images on a recording medium by ejecting ink droplets from the nozzles while the conveyance mechanism 240 conveys the recording medium. The main scan mechanism 230 includes a main scan motor 232, and a main scan motor drive unit 231 for driving the main scan motor 232. The main scan mechanism 230 reciprocates the print head 222 in a main scanning direction (movement in one direction being a main scan) using the drive force of the main scan motor 232.

Figure 2A:
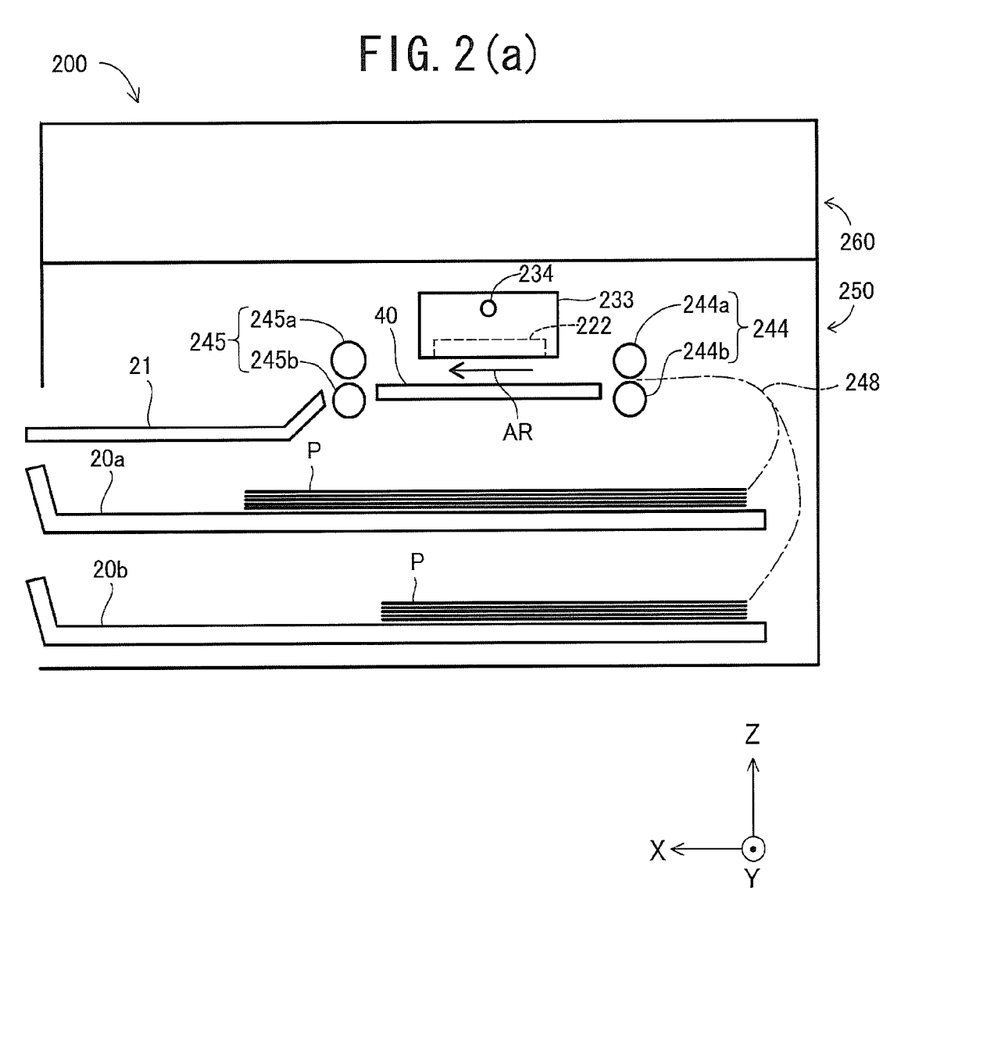
FIG. 2(a) is a schematic diagram illustrating a structure of an overall inkjet printing unit.

FIG. 2(*a*) illustrates the structure of the overall inkjet printing unit 250, while FIG. 2(*b*) shows the structure of the print head 222 when viewed from the bottom in FIG. 2(*a*). As shown in FIG. 2(*a*), the inkjet printing unit 250 further includes paper trays 20*a* and 20*b* for accommodating paper P serving as the recording medium, a discharge tray 21 for receiving the sheets of paper P discharged from the MFP 200 after being printed, and a platen 40 disposed to confront the surface of the print head 222 from which ink is ejected.

The conveyance mechanism 240 conveys sheets of paper P along a conveying path extending from the paper trays 20*a* and 20*b*, over the platen 40, and to the discharge tray 21. An arrow AR in FIG. 2 indicates the direction in which the paper P is conveyed over the platen 40. Hereinafter, the direction in which the paper P is conveyed over the platen 40 will be referred to as a "conveying direction AR." By conveying the paper P over the platen 40 in the conveying direction AR, the print head 222 moves opposite the conveying direction AR relative to the paper P. The direction opposite the conveying direction AR is referred to as the "sub-scanning direction," and a "sub scan" is the act of moving the print head 222 relative to the paper P or other recording medium in the sub-scanning direction. Further, the side of an object in the direction opposite a prescribed direction will be referred to as the "upstream side" of the prescribed direction, while the side in the prescribed direction will be referred to as the "downstream side" of the prescribed direction.

The conveyance mechanism 240 further includes an upstream clamping unit 244 disposed on the upstream side of the platen 40 relative to the conveying direction AR, a downstream clamping unit 245 disposed on the downstream side of the platen 40 in the conveying direction AR, an upstream conveying path 248 extending from the paper trays 20*a* and 20*b* to the upstream clamping unit 244 (indicated by dotted lines in FIG. 2(*a*)), and an upstream conveying unit (not shown) disposed on the upstream conveying path 248 for conveying the paper P. The upstream clamping unit 244 includes an upstream conveying roller 244*a* that is driven to rotate by the conveying motor 242, and an upstream follow roller 244*b*. Together the rollers 244*a* and 244*b* grip the sheets of paper P and convey the sheets in the conveying direction AR. The downstream clamping unit 245 includes a downstream conveying roller 245*a* that is driven to rotate by the conveying motor 242, and a downstream follow roller 245*h*. Together the rollers 245*a* and 245*b* grip the sheets of paper P and convey the sheets in the conveying direction AR. Alternatively, plate members may be employed in place of the follow rollers 244b and 245b.

The rotary encoder 243 described above (see FIG. 1) is a rotary sensor that outputs pulses in response to rotation of the upstream conveying roller 244a. The conveying motor drive unit 241 described above (see FIG. 1) drives the conveying motor 242 to rotate based on the pulses outputted from the rotary encoder 243 to control the distance in which each sheet of paper P is conveyed. Accordingly, the precision of conveying the paper P is dependent on the resolution of the rotary encoder 243.

The main scan mechanism 230 further includes a carriage 233 in which the print head 222 is mounted, and a sliding shaft 234 for retaining the carriage 233 in a manner that allows the carriage 233 to move reciprocally in the main scanning direction (along the Y-axis in FIG. 2). The carriage 233 performs main scans using the drive force of the main scan motor 232 to reciprocate the carriage 233 along the sliding shaft 234.

As shown in FIG. 2(b), nozzle rows NC, NM, NY, and NK for ejecting ink in the respective colors cyan, magenta, yellow, and black are formed in the surface of the print head 222 that opposes the platen 40. Each row of nozzles includes a plurality (210 in this example) of nozzles through which ink of the same color is ejected in order to form dots on the paper P. A piezoelectric element (not shown) is provided for each nozzle for driving the respective nozzle to eject ink. As shown in FIG. 2(b), the nozzles in each row are aligned in the sub-scanning direction at a nozzle pitch N. Note that it is also possible to arrange the nozzles of each row in a staggered formation, for example, rather than the linear formation shown in FIG. 2(b).

A-2. Printing Methods

Next, the methods of printing supported by the print control unit M20 (see FIG. 1) will be described. The print control unit M20 prints by controlling the ink ejection mechanism 220, the main scan mechanism 230, and the conveyance mechanism 240 to execute a unit print and a unit sub scan repeatedly and alternatingly. The "unit print" is a printing operation performed by driving the nozzles of the print head 222 during a main scan while the sheet of paper P is halted on the platen 40. A single main scan corresponding to a single unit print is also called a "pass." The "unit sub scan" is performed by conveying the sheet of paper P in the conveying direction AR exactly a prescribed unit conveying distance L.

Figure 3A:
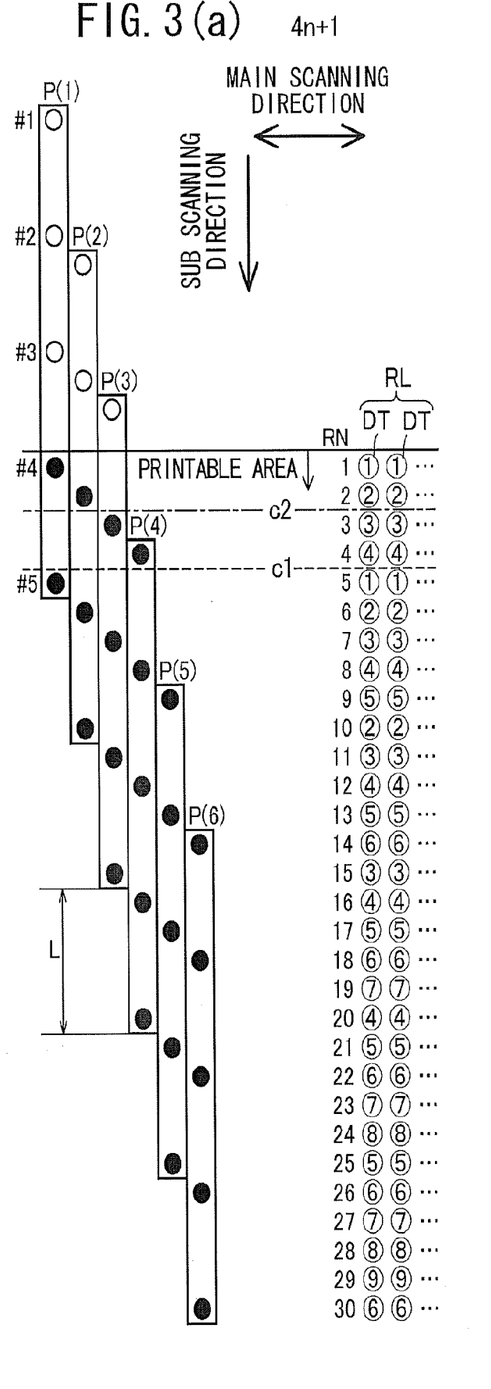
FIG. 3(a) is an explanation diagram illustrating a 4n+1 printing method.
Figure 3B:
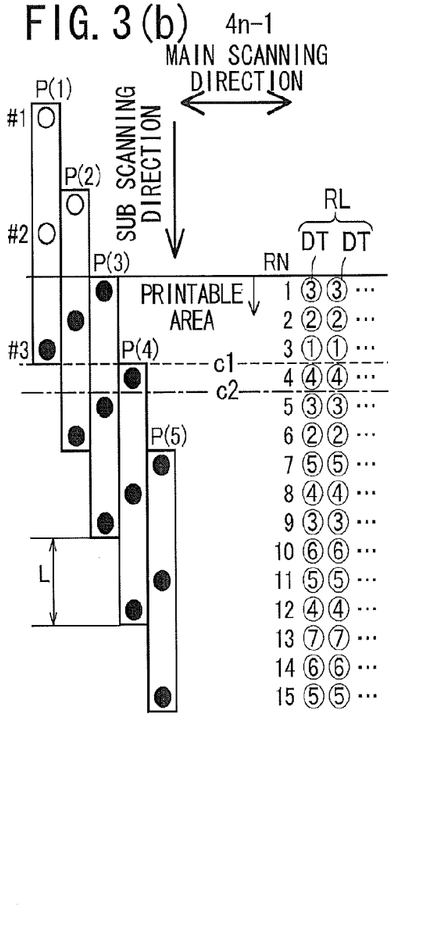
FIG. 3(b) is an explanation diagram illustrating a 4n−1 printing method.
Figure 4A:
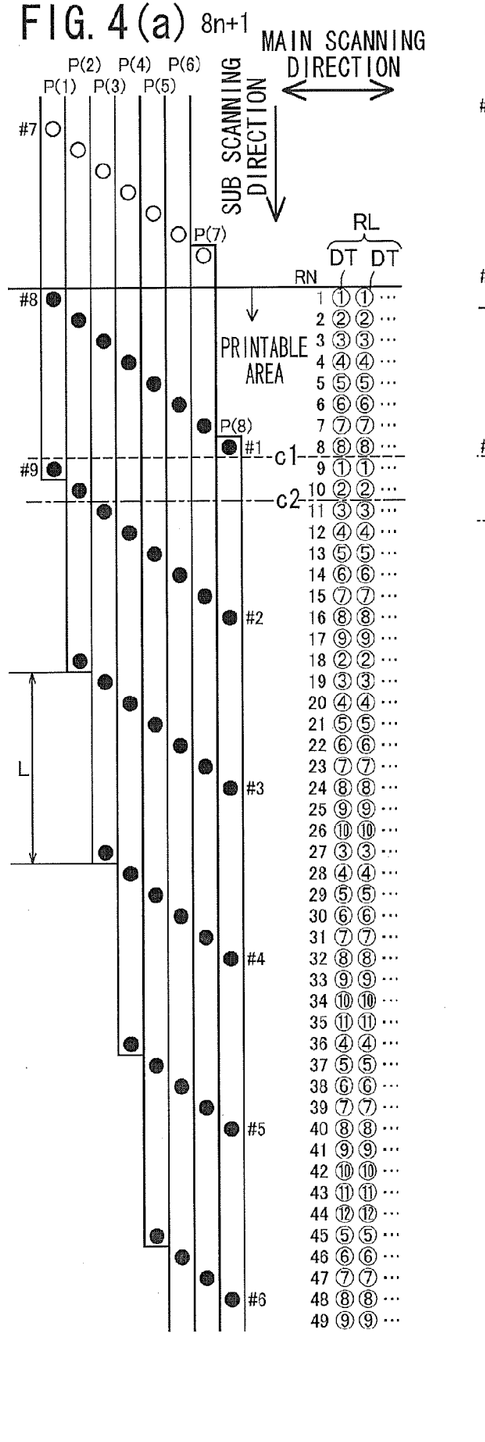
FIGS. 4(a) is an explanation diagram illustrating a 8n+1 printing method.
Figure 4B:
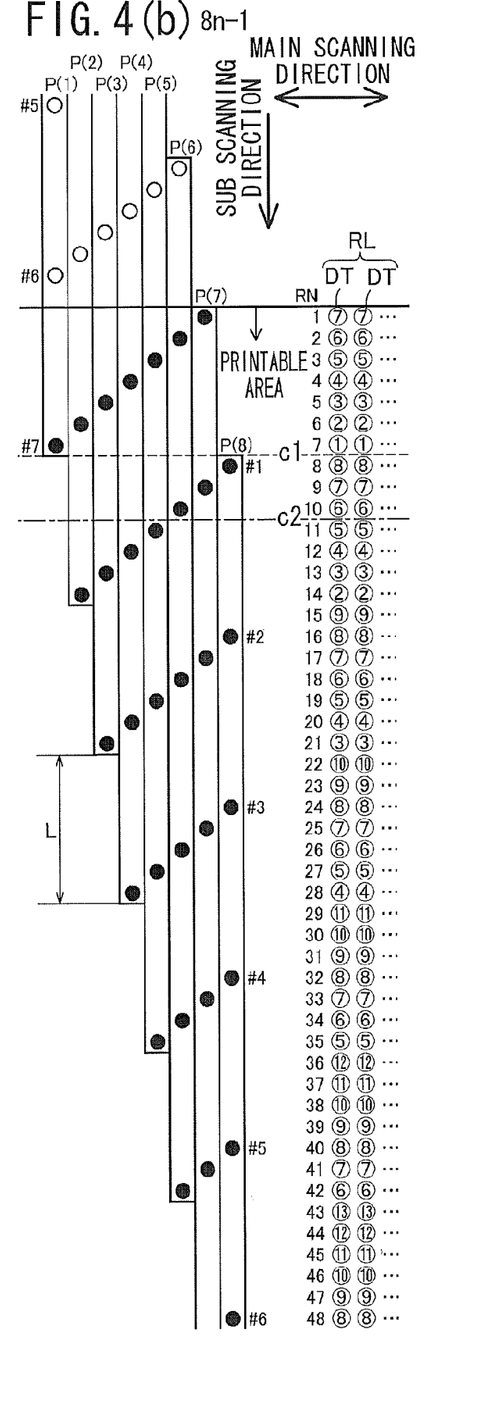
FIGS. 4(b) is an explanation diagram illustrating a 8n−1 printing method.
Figure 5A:
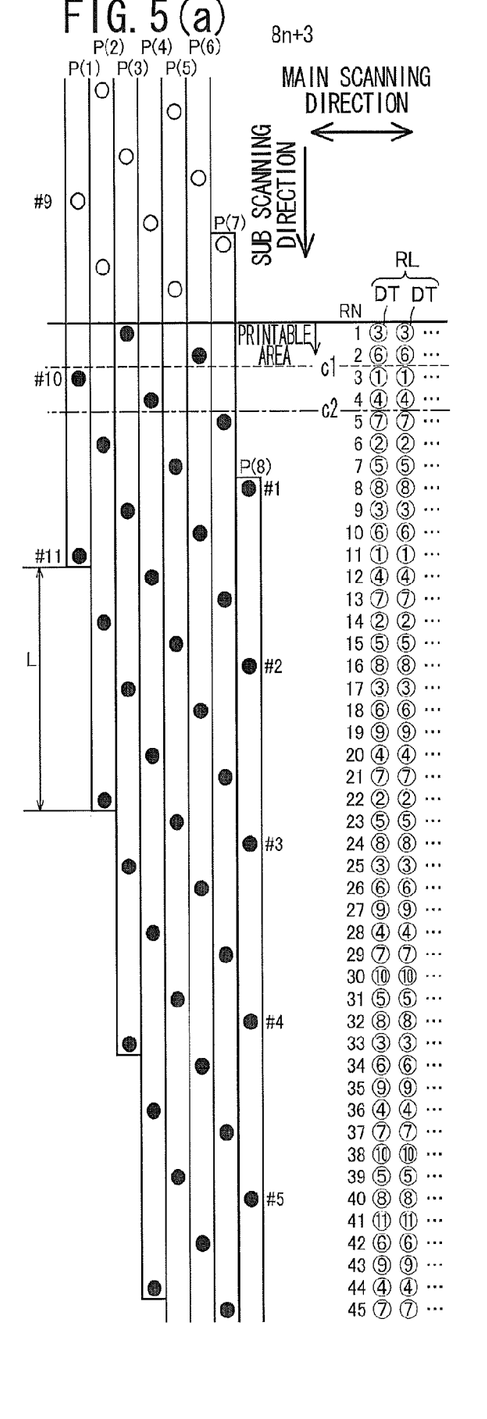
FIGS. 5(a) is an explanation diagram illustrating a 8n+3 printing method.
Figure 5B:
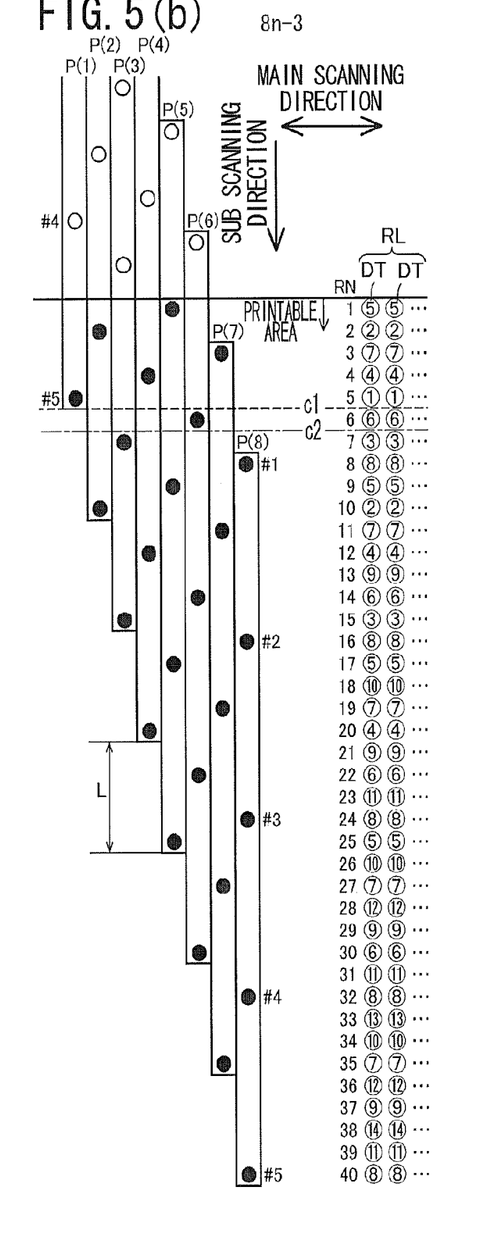

The print control unit M20 can perform interlaced printing using two types of printing methods with respect to "four passes" and four types of printing methods with respect to "eight passes". FIGS. 3(a) and 3(b) illustrate four-pass printing methods. FIG. 3(a) illustrates a 4n+1 printing method, while FIG. 3(b) illustrates a 4n−1 printing method. FIGS. 4(a), 4(b), 5(a), and 5(b) illustrate eight-pass printing methods. FIGS. 4(a) and 4(b) illustrate 8n+1 and 8n−1 printing methods, respectively. FIGS. 5(a) and 5(b) illustrate 8n+3 and 8n−3 printing methods, respectively.

With interlaced printing, the MFP 200 can print at a higher resolution in which the line spacing (dot pitch in the sub-scanning direction) of a plurality of raster lines RL is smaller than the nozzle pitch N of nozzles arranged in the sub-scanning direction. Here, a raster line RL is a line formed by dots DT aligned in the main scanning direction. A printed image is formed by arranging a plurality of raster lines RL in the sub-scanning direction. Each of the raster lines forming the printed image is assigned a sequential raster number RN in order from the upstream side to the downstream side in the sub-scanning direction. In the following description, a raster line RL having raster number j (where j is a natural number) will be given the notation raster line RL(j).

FIGS. 3(a) through 5(b) show the positions of the nozzles relative to the sub-scanning direction for each pass. The number of passes k of a printing method is expressed as <nozzle pitch N>/<line spacing D>. Hence, a four-pass printing method denotes printing at a line spacing D of one-fourth the nozzle pitch N of the nozzles being used, and an eight-pass printing method denotes printing at a line spacing D of one-eighth the nozzle pitch N. In other words, when using an eight-pass printing method, the MFP 200 can print at twice the resolution in the sub-scanning direction than when using a four-pass printing method. Further, the notation "P(m)" is used to identify each pass, where "m" indicates the order in which each pass is executed. The numbers included under dots DT in the drawings for each raster line denote the pass in which a dot DT is formed on the corresponding raster line RL. For example, dots DT on raster lines RL(1) and RL(5) are formed in pass P(1), while dots DT on raster lines RL(2), RL(6), and RL(10) are formed in pass P(2).

The solid horizontal lines included in each drawing represent the start of the printable area. Thus, raster lines RL cannot be printed on the upstream side of (above, in the drawings) this horizontal line with respect to the sub-scanning direction.

The name given to each printing method is expressed in the form "kn+b," where n is a natural number determined by the number of nozzles being used, k is the number of passes represented by N/D and is a value of 3 or greater, and b is a non-zero integer satisfying the expression $-(1/2)k \le b \le (1/2)k$. This notation represents a printing method in which the number of nozzles used is (kn+b) and the unit conveying distance L is D×(k×n+b). For example, the 4n+1 printing method shown in FIG. 3(a) is a four-pass printing method that uses 201 nozzles to print a unit conveying distance L that is 201 times the line spacing D (when n=50). Similarly, the 8n+3 printing method shown in FIG. 5(a) is an eight-pass printing method (hence, the line spacing D is half the line spacing D in a four-pass printing method) that uses 203 nozzles to print a unit conveying distance L that is 203 times the line spacing D (when n=25), for example. In order to avoid needless complexity in the drawings, all examples illustrate a case in which n=1. The unit conveying distance L in these examples is an ideal conveying distance equivalent to the line spacing for all printed raster lines and will be called the "target unit conveying distance L." The actual unit conveying distance is the sum of the target unit conveying distance L and an error ΔL (L+ΔL). The line spacing D used in these examples is an ideal line spacing D achieved with the ideal unit conveying distance L and will be called the "target line spacing D." The actual line spacing is the sum of the target line spacing D and an error ΔD (D+ΔD).

The printing methods 4n+1 (see FIG. 3(a)) and 4n−1 (see FIG. 3(b)) are similar in that they are both four-pass printing methods, but differ in the order in which the raster lines composing the printed image are printed. Here, a description will be given of a pass P(m) for printing regions of the image, excluding the ends of the image in the sub-scanning direction. In interlaced printing, each pass P(m) prints raster lines both (1) in a partially printed region that has already been printed by some of the raster lines in the previous pass P(m−1) and (2) in a region downstream of the partially printed region in the sub-scanning direction. In the 4n+1 method, each pass P(m) prints raster lines in the partially printed region that are adjacent to the raster lines printed in the previous pass P(m−1) and on the downstream side of the same with respect to the sub-scanning direction. In the 4n−1 method, each pass P(m) prints raster lines in the partially printed region that are adjacent to the raster lines printed in the previous pass P(m−1) and on the upstream side of the same with respect to the sub-scanning direction.

The printing methods 8n+1 (see FIG. 4(a)), 8n−1 (see FIG. 4(b)), 8n+3 (see FIG. 5(a)), and 8n−3 (see FIG. 5(b)) are similar in that they are all eight-pass printing methods, but differ in the order for printing the plurality of raster lines composing each printed image. More specifically, the pass P(m) in the 8n+1 method prints raster lines in the partially printed region that are adjacent to raster lines printed in the previous pass P(m−1) and on the downstream side in the sub-scanning direction. The pass P(m) in the 8n−1 method print raster lines in the partially printed region that are adjacent to raster lines printed in the previous pass P(m−1) and on the upstream side of the same in the sub-scanning direction. The pass P(m) in the 8n+3 method prints raster lines in the partially printed region positioned three lines downstream in the sub-scanning direction of the raster lines printed in the previous pass P(m−1). The pass P(m) in the 8n−3 method print raster lines in the partially printed region positioned three lines upstream in the sub-scanning direction of the raster lines printed in the previous pass P(m−1).

A-3. Configuration Device and Configuration Process

The configuration system 1000 shown in FIG. 1 includes a configuration device 300, and an optical measuring system 400. The configuration device 300 is a common computer that is provided with a CPU 310, and a storage device 320. The configuration device 300 is connected to and uses the MFP 200 and the optical measuring system 400. The storage device 320 stores a configuration process program 321. By executing the configuration process program 321, the CPU 310 functions as a configuration process unit M30. The configuration process unit M30 includes a measurement chart printing unit M31, a chart measuring unit M32, a statistical processing unit M33, and a printing method determining unit M34.

The optical measuring system 400 can measure dimensions and other quantities of an object and its components with high precision (between 0.1 μm and a few μm) by capturing images of an object with a camera via a magnifier and analyzing the captured images. One specific example of the optical measuring system 400 is Nikon's NEXIV VMR-H3030.

Figure 6:
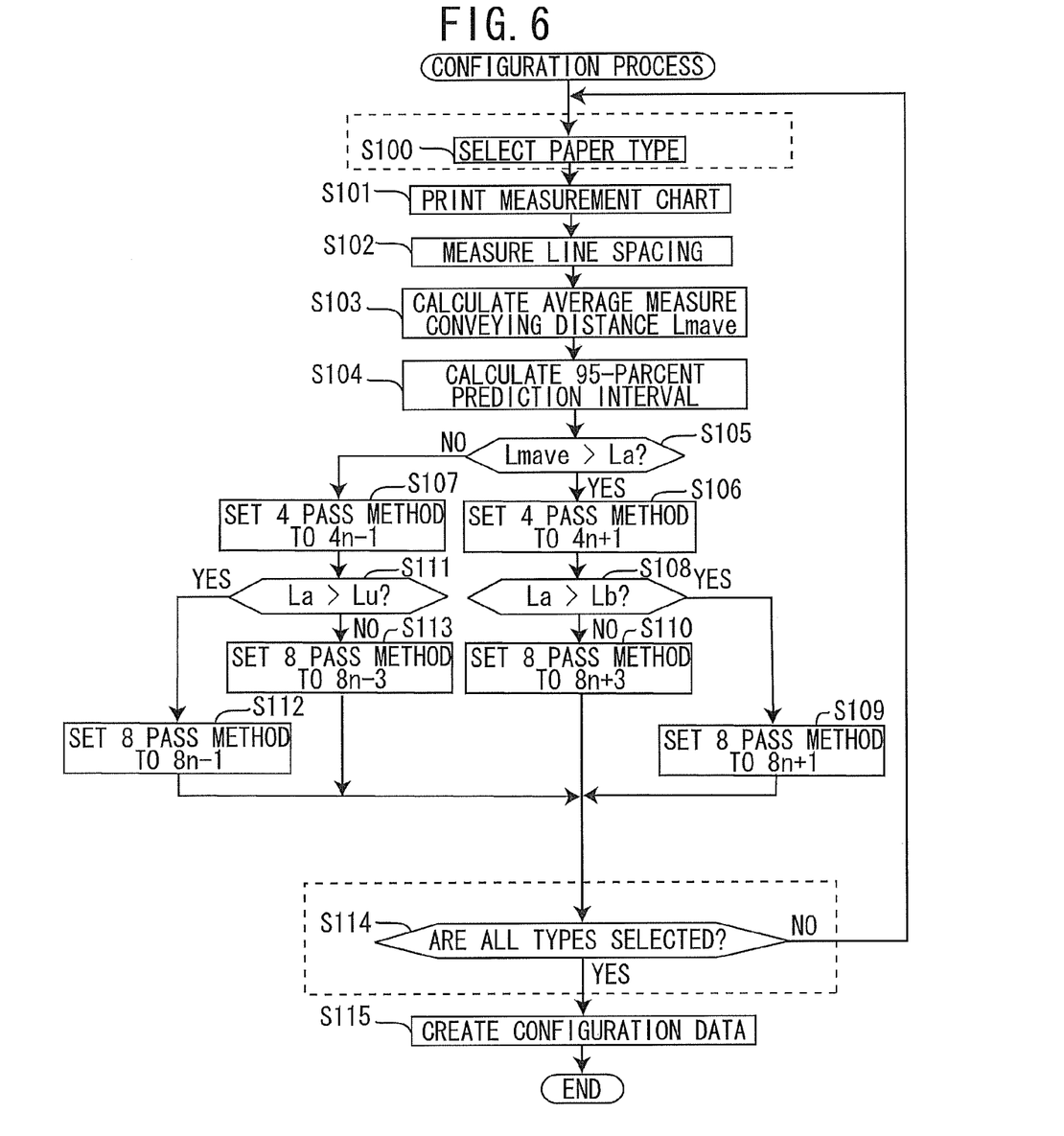
FIG. 6 is a flowchart illustrating steps in a printing method configuration process.

FIG. 6 is a flowchart illustrating steps in a printing method configuration process. Steps S100 and S114 circumscribed with dashed lines in FIG. 6 are not included in the first embodiment. This configuration process is executed by the configuration process unit M30 of the configuration device 300 in response to an operation performed by an operator for setting printing methods in the MFP 200 to be used by the inkjet printing unit 250. This configuration process is executed on a single MFP 200 at a time during a stage in the manufacturing process of the MFP 200, for example.

In steps S101-S103, the configuration process unit M30 acquires property data indicating sub-scanning direction properties of the MFP 200. FIG. 7 illustrates the process of acquiring the sub-scanning properties.

In S101 the measurement chart printing unit M31 prints a measurement chart using the inkjet printing unit 250 wherein a reference conveying distance La is the target value. Specifically, the measurement chart printing unit M31 provides print data to the MFP 200 for printing the measurement chart. The print data is configured such that the inkjet printing unit 250 repeatedly executes a unit print for printing a single raster line RL in one pass using one of the plurality of nozzles in the print head 222, followed by a unit sub scan at the reference conveying distance La. The reference conveying distance La is set to a distance close in the value to the all target unit conveying distances L in the six types of printing methods described above. The reference conveying distance La may be set to a distance close in the value to at least one of the target unit conveying distances L in the six types of printing methods described above. Since the target unit conveying distance L for the six types of printing methods described above are approximately 200 times the nozzle pitch N in the embodiment, the reference conveying distance La is set to 200×N, for example.

Figure 7A:
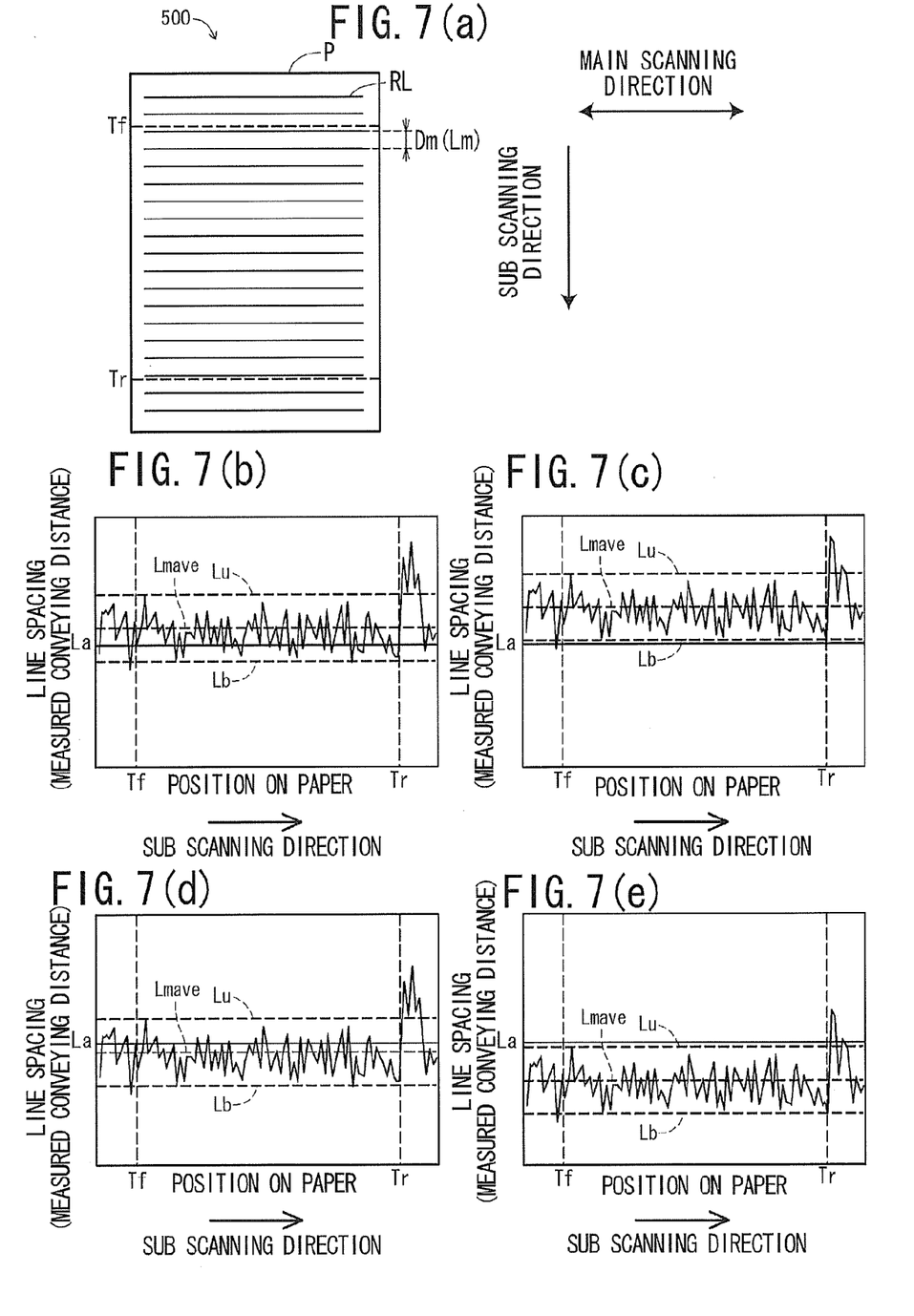

FIG. 7(a) shows the results of printing a measurement chart 500. The measurement chart 500 includes a plurality of raster lines RL printed on a sheet of paper P and juxtaposed at intervals in the sub-scanning direction.

In S102 the chart measuring unit M32 uses the optical measuring system 400 to measure the line spacing Dm between adjacent raster lines RL for all raster lines RL in the measurement chart 500. FIGS. 7(b)-7(e) show sample graphs in which the measured line spacing Dm is plotted in relation to positions on the paper P. The line spacing Dm corresponds to the actual conveying distances in unit sub scans executed during the process to print the measurement chart 500. In the following description, the results of measuring the line spacing Dm will be called the measured conveying distance Lm.

In S103 the statistical processing unit M33 averages the measured conveying distances Lm based on the measured line spacing Dm to find the average measured conveying distance Lmave. In S104 the statistical processing unit M33 calculates a 95-percent prediction interval (lower bound Lb<Lm<upper bound Lu) based on the measured line spacing Dm. The lower bound Lb and the upper bound Lu are found according to equations (1) and (2) given below, where N is the sample size of measured conveying distances Lm, V is the variance, and t (degrees of freedom, risk) is the t-distribution (Student's distribution).

$$Lb = Lmave - t(N-1, 0.05)\sqrt{\left(1+\frac{1}{N}\right)V} \quad (1)$$

$$Lu = Lmave + t(N-1, 0.05)\sqrt{\left(1+\frac{1}{N}\right)V} \quad (2)$$

Note that only the measured line spacing Dm of raster lines RL printed when the paper P is clamped by both the upstream clamping unit 244 and the downstream clamping unit 245 (i.e., when the paper P is in a double-clamped state) is used for calculating the average measured conveying distance Lmave and the prediction interval. In other words, the line spacing Dm of raster lines RL printed when the paper P is clamped by only one of the upstream clamping unit 244 and the downstream clamping unit 245 (in a single-clamped state) is excluded in the calculations. More specifically, only the line spacing Dm of raster lines RL printed between prescribed positions Tf and Tr on the paper P shown in FIGS. 7(a) and 7(b) are used. By employing this method, the chart measuring unit M32 can acquire more accurate measurements of the sub-scanning properties when the paper P is in the double-clamped state, which accounts for the majority of the printing operation.

The prediction interval (from Lb to La) is an estimate of an interval in which data of future measurements will fall given the data that has already been measured. By calculating the prediction interval, it is possible to predict the range in which actual conveyance amounts will be distributed when the unit conveying distance L is set to the target conveyance value during a printing operation.

In S105 the printing method determining unit M34 determines whether the average measured conveying distance Lmave is greater than the reference conveying distance La. If the average measured conveying distance Lmave is greater than the reference conveying distance La (S105: YES), in S106 the printing method determining unit M34 sets the four-pass printing method to 4n+1. However, if the average measured conveying distance Lmave is smaller than or equal to the reference conveying distance La (S105: NO), in S107 the printing method determining unit M34 sets the four-pass printing method to 4n−1.

In S108 the printing method determining unit M34 determines whether the lower bound Lb is greater than the reference conveying distance La. If the lower bound Lb is greater than the reference conveying distance La (S108: YES), in S109 the printing method determining unit M34 sets the eight-pass printing method to 8n+1. However, if the lower bound Lb is smaller than or equal to the reference conveying distance La (S108: NO), in S110 the printing method determining unit M34 sets the eight-pass printing method to 8n+3.

In S111 the printing method determining unit M34 determines whether the upper bound Lu is smaller than the reference conveying distance La. If the upper bound Lu is smaller than the reference conveying distance La (S111: YES), in S112 the printing method determining unit M34 sets the eight-pass printing method to 8n−1. However, if the upper bound Lu is greater than or equal to the reference conveying distance La (S111: NO), in S113 the printing method determining unit M34 sets the eight-pass printing method to 8n−3.

In S115 the configuration process unit M30 creates the configuration data 292 (see FIG. 1) specifying the printing methods set in the above process and stores the configuration data 292 in the storage unit 290 of the MFP 200. The printing method configuration process ends after completing S115. The configuration data 592 generated and stored in the configuration process of the first embodiment is data describing the printing methods set for both four-pass and eight-pass printing (first configuration data in FIG. 1).

FIG. 7(b) shows sub-scanning properties for the case in which the average measured conveying distance Lmave is greater than the reference conveying distance La and the lower bound Lb is smaller than or equal to the reference conveying distance La. When the MFP 200 having these sub-scanning properties executes a printing operation using the target unit conveying distance L, the actual unit conveying distances tend to be larger than the target unit conveying distance L on average, but will also likely include some variation producing conveying distances smaller than the target unit conveying distance L. For these sub-scanning properties, the four-pass printing method is set to 4n+1 (S106) and the eight-pass printing method to 8n+3 (S110) in the above configuration process.

FIG. 7(c) shows sub-scanning properties for a case in which the lower bound Lb is greater than the reference conveying distance La. When the MFP 200 having these sub-scanning properties executes a printing operation using the target unit conveying distance L, the actual unit conveying distances are almost certainly always greater than the target unit conveying distance L. In this case, the four-pass printing method is set to 4n+1 (S106) and the eight-pass printing method to 8n+1 (S109) in the above configuration process.

FIG. 7(d) shows sub-scanning properties for a case in which the average measured conveying distance Lmave is smaller than or equal to the reference conveying distance La and the upper bound Lu is greater than or equal to the reference conveying distance La. When the MFP 200 having these sub-scanning properties executes a printing operation using the target unit conveying distance L, the actual unit conveying distances tend to be smaller than the target unit conveying distance L on average, with some irregular values being greater than the target unit conveying distance L. In this case, the four-pass printing method is set to 4n−1 (S107) and the eight-pass printing method to 8n−3 (S113) in the above configuration process.

FIG. 7(e) shows sub-scanning properties for the case in which the upper bound Lu is smaller than the reference conveying distance La. When the MFP 200 having these sub-scanning properties executes a printing operation using the target unit conveying distance L, the actual unit conveying distances are almost certainly always smaller than the target unit conveying distance L. In this case, the four-pass printing method is set to 4n−1 (S107) and the eight-pass printing method to 8n−1 (S112) in the above configuration process.

The reasoning behind determining a printing method based on the above criteria will be described next.

A-4. White Streaks Caused by Conveyance Error in the Printing Methods

In the following description, PN(s) denotes the number of the pass for printing a raster line RL(s), where "s" stands for the raster number RN described above (see FIGS. 3(a)-5(b)), and PN(s+1) denotes the number of the pass for printing the raster line RL(S+1), which is adjacent to and downstream of the raster line RL(s) in the sub-scanning direction. A pass number difference $\Delta PN(s)$ denoting the difference between the two raster lines RL(s) and RL(s+1) is defined as $\Delta PN(s) = PN(s+1) - PN(s)$. $\Delta PN(s)$ is a non-zero integer. "$\Delta PN(s)=2$" indicates that raster line RL(s+1) is printed in the second pass after the pass for printing raster line RL(s). "$\Delta PN(s)=-2$" indicates that raster line RL(s+1) is printed two passes prior to the pass for printing the raster line RL(s).

The pass number difference $\Delta PN(s)$ is an index value for evaluating the line spacing error $\Delta D(s)$ between the two raster lines RL(s) and RL(s+1). As the line spacing error $\Delta D(s)$ increases, the actual line spacing grows wider than the target line spacing D, increasing the likelihood of white streaks being produced. When the actual unit conveying distance is greater than the target unit conveying distance L by an error $\Delta L$, the line spacing error $\Delta D(s)$ can be expressed in the following equation (3).

$$\Delta D(s) = \Delta PN(s) \times \Delta L \quad (3)$$

Equation (3) signifies that the line spacing error $\Delta D(s)$ can be expressed by accumulating the conveying distance error $\Delta L$ a number of times equivalent to the absolute value of the pass number difference $\Delta PN(s)$. Hence, the absolute value of the line spacing error $\Delta D(s)$ increases as the absolute value of the pass number difference $\Delta PN(s)$ increases. Further, if the pass number difference $\Delta PN(s)$ is positive and the conveying distance error $\Delta L$ is positive, the actual line spacing will be greater than the target line spacing D. Similarly, if the pass number difference $\Delta PN(s)$ is negative and the conveying distance error $\Delta L$ is negative, the actual line spacing will be greater than the target line spacing D. Therefore, when the conveying distance error $\Delta L$ is positive (i.e., when the actual unit conveying distance is greater than the intended unit conveying distance L) and when the pass number difference $\Delta PN(s)$ is positive, the potential for white streaks being produced between two raster lines corresponding to the pass number difference $\Delta PN(s)$ increases as the absolute value of pass number difference $\Delta PN(s)$ increases. When the conveying distance error $\Delta L$ is negative (i.e., when the actual unit conveying distance is smaller than the intended unit conveying distance L), and when the pass number difference ΔPN(s) is negative, the potential for white streaks being produced between two raster lines corresponding to the pass number difference ΔPN(s) increases as the absolute value of the pass number difference ΔPN(s) increases.

Here, the pass number difference having the largest absolute value among the pass number differences ΔPN(s) for all pairs of adjacent raster lines in the printer image will be called the maximum pass number difference. Further, the pass number difference having the largest absolute value among all positive pass number differences ΔPN(s) will be called the maximum positive pass number difference and the pass number difference having the largest absolute value among all negative pass number differences ΔPN(s) will be called the maximum negative pass number difference.

The following points can be understood from the above description.

1. When the conveying distance error ΔL is positive, white streaks are less likely to be produced in printing methods having a smaller absolute value of the maximum positive pass number difference.

2. When the conveying distance error ΔL is negative, white streaks are less likely to be produced in printing methods having a smaller absolute value of the maximum negative pass number difference.

3. When both positive and negative conveying distance errors ΔL are generated, white streaks are less likely to be produced in printing methods having a smaller absolute value of the maximum pass number difference.

Based on the above points, the two four-pass printing methods shown in FIGS. 3(a) and 3(b) will be considered. For the 4n+1 printing method (see FIG. 3(a)), the pass number difference ΔPN(s) takes on one of the values "−3" or "1". For example, the pass number difference ΔPN(4) between raster lines RL(4) and RL(5) is "−3" (indicated by the dotted line c1 in FIG. 3(a)). The pass number difference ΔPN(2) between raster lines RL(2) and RL(3) is "1" (indicated by the dotted line c2 in FIG. 3(a)). Hence, the maximum pass number difference and the maximum negative pass number difference for the 4n+1 printing method are both "−3", while the maximum positive pass number difference is "1".

For the 4n−1 printing method (see FIG. 3(b)), the pass number difference ΔPN(s) takes on one of the values "3" or "−1". For example, the pass number difference ΔPN(3) between raster lines RL(3) and RL(4) is "3" (indicated by the dotted line c1 in FIG. 3(b)). The pass number difference ΔPN(4) between raster lines RL(4) and RL(5) is "−1" (indicated by the dotted line c2 in FIG. 3(b)). Hence, the maximum pass number difference and the maximum positive pass number difference for the 4n−1 printing method are both "3", while the maximum negative pass number difference is "−1".

The maximum positive pass number difference in the 4n+1 method has a smaller absolute value than the absolute value of the maximum positive pass number difference in the 4n−1 method. Therefore, the 4n+1 method is less likely to produce white streaks than the 4n−1 method when the conveying distance error ΔL is positive, i.e., when the actual unit conveying distance is greater than the target unit conveying distance L. However, the maximum negative pass number difference in the 4n−1 method has a smaller absolute value than the absolute value of the maximum negative pass number difference in the 4n+1 method. Therefore, the 4n−1 method is less likely to produce white streaks than the 4n+1 method when the conveying distance error ΔL is negative, i.e., when the actual unit conveying distance is smaller than the target unit conveying distance L.

Based on the above description, it is clear that the 4n+1 method is the more desirable four-pass printing method when there is a high probability that the actual unit conveying distance will be greater than the target unit conveying distance L and that the 4n−1 method is preferable when there is a high probability that the actual unit conveying distance will be smaller than the target unit conveying distance L.

Next, the four eight-pass printing methods shown in FIGS. 4(a)-5(b) will be considered. For the 8n+1 method (see FIG. 4(a)), the pass number difference ΔPN(s) takes on one of the values "−7" or "1". For example, the pass number difference ΔPN(8) between raster lines RL(8) and RL(9) is "−7" (indicated by the dotted line c1 in FIG. 4(a)). The pass number difference ΔPN(10) between raster lines RL(10) and RL(11) is "1" (indicated by the dotted line c2 in FIG. 4(a)). Hence, the maximum pass number difference and the maximum negative pass number difference for the 8n+1 printing method are both "−7", while the maximum positive pass number difference is "1".

For the 8n−1 method (see FIG. 4(b)), the pass number difference ΔPN(s) takes on one of the values "7" or "−1". For example, the pass number difference ΔPN(7) between raster lines RL(7) and RL(8) is "7" (indicated by the dotted line c1 in FIG. 4(b)). The pass number difference ΔPN(10) between raster lines RL(10) and RL(11) is "−1" (indicated by the dotted line c2 in FIG. 4(b)). Hence, the maximum pass number difference and the maximum positive pass number difference for the 8n−1 printing method are both "7", while the maximum negative pass number difference is "−1".

For the 8n+3 method (see FIG. 5(a)), the pass number difference ΔPN(s) takes on one of the values "−5" or "3". For example, the pass number difference ΔPN(2) between raster lines RL(2) and RL(3) is "−5" (indicated by the dotted line c1 in FIG. 5(a)). The pass number difference ΔPN(4) between raster lines RL(4) and RL(5) is "3" (indicated by the dotted line c2 in FIG. 5(a)). Hence, the maximum pass number difference and the maximum negative pass number difference for the 8n+3 printing method are both "−5", while the maximum positive pass number difference is "3".

For the 8n−3 method (see FIG. 5(b)), the pass number difference ΔPN(s) takes on one of the values "5" or "−3". For example, the pass number difference ΔPN(5) between raster lines RL(5) and RL(6) is "5" (indicated by the dotted line c1 in FIG. 5(b)). The pass number difference ΔPN(6) between raster lines RL(6) and RL(7) is "−3" (indicated by the dotted line c2 in FIG. 5(b)). Hence, the maximum pass number difference and the maximum positive pass number difference for the 8n−3 printing method are both "5", while the maximum negative pass number difference is "−3".

From the above results, the printing methods can be arranged in order based on the absolute values of their maximum positive pass number differences from smallest to largest, as follows: 8n+1 <8n+3<8n−3<8n−1. Consequently, the order of these methods beginning from the method least likely to produce white streaks for a positive conveying distance error ΔL is 8n+1, 8n+3, 8n−3, and 8n−1.

Similarly, the printing methods can be arranged in order based on the absolute values of their maximum negative pass number differences from smallest to largest, as follows: 8n<1<8n−3<8n+3<8n+1. Consequently, the order of these methods beginning from the method least likely to produce white streaks for a negative conveying distance error ΔL is 8n−1, 8n−3, 8n+3, and 8n+1.

Similarly, the printing methods can be arranged in order based on the absolute values of their maximum pass number differences, as follows: 8n−3=8n+3 <8n−1=8n+1. Consequently, printing methods 8n−3 and 8n+3 are less likely to produce white streaks than the methods 8n−1 and 8n+1 for cases in which both negative and positive conveying distance errors ΔL occur.

Thus, based on the above description, when it is likely that both positive and negative conveying distance errors ΔL will occur, the eight-pass method 8n+3 or 8n−3 should be given preference to the methods 8n+1 and 8n−1. When deciding between methods 8n+3 and 8n−3, the 8n+3 method is preferable when the conveying distance error ΔL is likely to be positive, and the 8n−3 method is preferable when the conveying distance error ΔL is likely to be negative. Additionally, the 8n+1 method is preferable when the conveying distance error ΔL is almost certainly positive, and the 8n−1 method is preferable when the conveying distance error ΔL is almost certainly negative.

Figure 8:
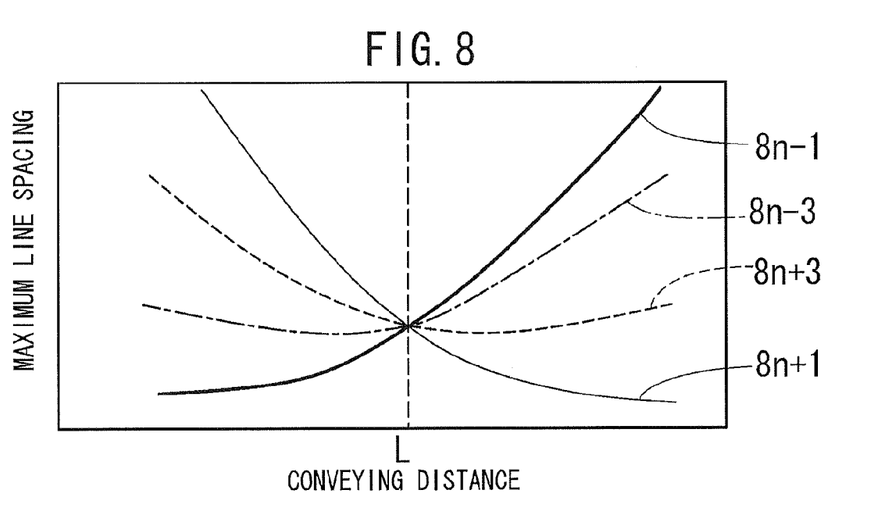
FIG. 8 is a graph showing results of simulating maximum line spacing values in printing operations performed using each of the eight-pass printing methods.

FIG. 8 is a graph showing the results of simulating the maximum line spacing values in printing operations performed using each of the eight-pass printing methods, based on the sub-scanning properties obtained through measurements of the measurement chart 500 described earlier. In this simulation, variation in the maximum line spacing was calculated for cases in which the actual unit conveying distance diverged from the target unit conveying distance L in each printing method. In FIG. 8, the target unit conveying distance L for all printing methods have been aligned at the same position on the horizontal axis (indicated by L in FIG. 8, and changes in the maximum line spacing values are plotted according to deviations from this position. White streaks become more likely to occur as the maximum line spacing increases and less likely to occur as the maximum line spacing decreases. In this simulation, the relationship among the eight-pass printing methods based on their maximum line spacing within the region in which the actual unit conveying distance is greater than the target unit conveying distance L (the region in which the conveying distance error ΔL is positive) is 8n−1>8n−3>8n+3>8n+1. The relationship among the eight-pass printing methods based on their maximum line spacing is the opposite within the region in which the actual unit conveying distance is smaller than the target unit conveying distance L (the region in which the conveying distance error ΔL is negative): 8n−1<8n−3<8n+3 <8n+1. Further, the printing methods 8n−3 and 8n+3 have smaller changes in the maximum line spacing near the target unit conveying distance L and smaller maximum line spacing than the printing methods 8n−1 and 8n+1. In other words, the simulation supports the above description.

By selecting one of the printing methods that is best suited to the sub-scanning properties in the configuration process of the first embodiment, it is possible to suppress a decline in printing quality caused by white streaks produced in the printed image when performing interlaced printing on the MFP 200.

Further, a prediction interval is calculated in the configuration process and used as a criterion for determining the printing method. By using this prediction interval, it is possible to determine more reliably which printing method should be used from among the methods 8n−3 and 8n−1 and the methods 8n+3 and 8n+1.

In the configuration process described above, property data representing the sub-scanning properties of the MFP 200 is generated from the measurement chart 500 printed using the MFP 200. In this way, different sub-scanning properties can be easily acquired for individual MFPs 200.

In the configuration process described above, the MFP 200 prints the measurement chart 500 with a plurality of raster lines RL by repeatedly executing a unit print to print one raster line using one of the plurality of nozzles possessed by the print head 222, followed by a sub scan at the reference conveying distance La. Next, the property data representing the sub-scanning properties is created based on the spacing between adjacent raster lines RL in the measurement chart 500. In this way, differing sub-scanning properties for individual MFPs 200 can be generated with greater accuracy based on the line spacing of the raster lines RL.

Further, since the configuration data 292 (the first configuration data in FIG. 1) is stored on the MFP 200 through the configuration process described above, the MFP 200 can reference the configuration data 292 to select a suitable printing method for its own sub-scanning properties.

B. Second Embodiment

Next, the structure of the MFP 200 according to a second embodiment will be described with reference to FIG. 1. The structure of the MFP 200 according to the second embodiment is identical to that described in the first embodiment, except that the print control unit M20 in the second embodiment includes a medium data acquisition unit M23 in addition to the functions described in the first embodiment. Further, the configuration data 292 in the MFP 200 according to the second embodiment includes the content shown as second configuration data in FIG. 1.

The configuration process of the second embodiment will be described next with reference to FIG. 6. In addition to the steps in the configuration process described in the first embodiment, the configuration process according to the second embodiment includes steps S100 and S114 that are circumscribed by dashed lines in FIG. 6. In S100 the configuration process unit M30 of the configuration device 300 selects one paper type from among a plurality of selectable types of paper. In S114 the configuration process unit M30 determines whether all of the selectable paper types have been selected in S100. If all available types of paper have been selected (S114: YES), the process advances to S115. However, if there remain types of paper that have not been selected (S114: NO), the configuration process unit M30 returns to S100 and selects another type of paper that was not previously selected. In this way, the configuration process unit M30 of the second embodiment can execute the process in S101-S113 for each available type of paper, thereby creating the configuration data 292 (the second configuration data in FIG. 1) indicating the printing methods that the MFP 200 should use in both four-pass and eight-pass interlaced printing for each type of paper.

Figure 9:
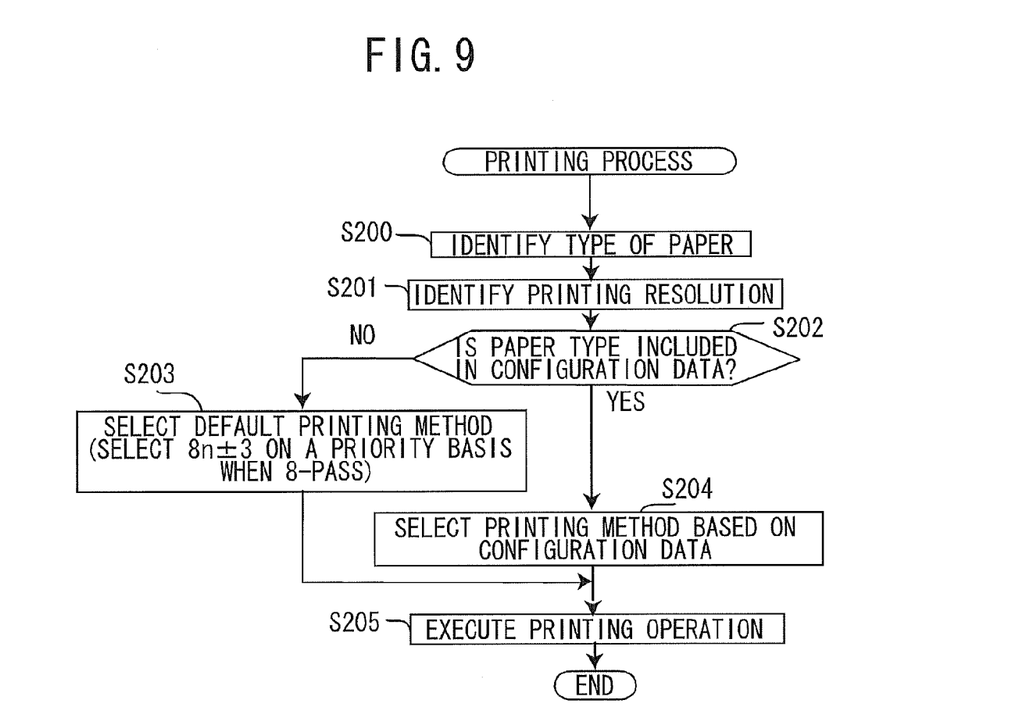
FIG. 9 is a flowchart illustrating steps in a printing process executed on the MFP according to the second embodiment.

FIG. 9 is a flowchart illustrating steps in a printing process executed on the MFP 200 according to the second embodiment. The print control unit M20 of the MFP 200 executes this printing process upon receiving a print job that requires interlaced printing.

In S200 of FIG. 9, the medium data acquisition unit M23 of the print control unit M20 acquires paper type data identifying the type of paper to be used in the printing operation. The print control unit M20 identifies the type of paper to be used based on the acquired paper type data. The paper type data may be data specifying the paper type that was received by the user via the operating unit 280 or a detection signal from a paper-type sensor provided in each of the paper trays 20a and 20b of the MFP 200, for example. Specifically, a sensor capable of detecting the paper type optically based on light reflective properties of the paper surface may be employed as the paper type sensor.

In S201 the print control unit M20 identifies the printing resolution in the sub-scanning direction, that is, the number of passes to be performed in interlaced printing, by referencing the print commands included in the print job, for example. In S202 the configuration data acquisition unit M21 of the print control unit M20 acquires and references the configuration data 292 to determine whether the paper type identified in S200 is included in the configuration data 292. If the paper type is included in the configuration data 292 (S202: YES), in S204 the printing method selection unit M22 of the print control unit M20 selects the printing method associated with the combination of the identified paper type and pass number based on the configuration data 292. However, if the configuration data 292 does not include the identified paper type (S202: NO), in S203 the printing method selection unit M22 selects a default printing method that has been defined for the pass number. The default eight-pass printing method in the embodiment is set to one of 8n+3 and 8n−3 and not 8n+1 or 8n−1. In other words, the printing method selection unit M22 is configured to select one of the methods 8n+3 or 8n−3 over one of the methods 8n+1 or 8n−1.

In S205 the print control unit M20 executes an interlaced printing operation based on the print job using the selected printing method. After interlaced print is completed, the printing process ends.

In the configuration process of the second embodiment described above, the configuration process unit M30 generates property data indicating the sub-scanning properties of the MFP 200 for each type of paper used in printing and creates the configuration data 292 based on this property data. As a result, the print control unit M20 can set printing methods suitable for the sub-scanning properties of an individual MFP 200 and for each type of paper.

The MFP 200 according to the second embodiment can acquire paper type data identifying the type of paper to be used in interlaced printing and can select a printing method by referencing the configuration data 292 to find the recommended printing method correlated with the identified paper type. As a result, the MFP 200 can execute interlaced printing using the most suitable printing method for sub-scanning properties that vary according to paper type. Specifically, sub-scanning properties can fluctuate due to the effect of the frictional coefficient on the surface of the paper, for example Further, if the configuration data 292 does not include the identified paper type, the MFP 200 according to the second embodiment gives priority to the 8n+3 or the 8n−3 printing method over the 8n+1 and 8n−1 printing methods, because as described earlier the 8n+3 and 8n−3 methods are relatively less likely to produce white streaks, regardless of whether the conveying distance error ΔL produced is negative or positive. Although the 8n+1 and 8n−1 methods are less likely to produce white streaks when conveying distance error ΔL is one of either positive or negative, the same methods are more likely to produce white streaks when the conveying distance error ΔL is of the other type. Accordingly, use of the 8n+3 or 8n−3 printing methods on paper types producing unknown sub-scanning properties can suppress the occurrence of white streaks.

C. Variations of the Embodiments

While the invention has been described in detail with reference to the embodiments thereof, it would be apparent to those skilled in the art that various changes and modifications may be made therein without departing from the scope of the invention.

(1) The MFP 200 in the embodiments described above may also be configured as a standalone printing device. Further, the inkjet printing unit 250 may be a printing device that does not perform main scans, known as a line printer. Further, the conveyance mechanism 240 of the inkjet printing unit 250 may be configured to move the print head over the paper in the sub-scanning direction while the paper remains fixed in position.

(2) The configuration process described in the embodiments (see FIG. 6) may also be performed periodically by the user of the MFP 200 rather than just during the manufacturing process. This would allow the user to set suitable printing methods based on changes in the sub-scanning properties of the MFP 200 that may occur as the MFP 200 ages. In this case, the configuration device 300 could be configured as a server accessible by the MFP 200 over the Internet. For example, the MFP 200 receives print data from the configuration device 300 for printing the measurement chart 500. After printing the measurement chart 500, the user of the MFP 200 then mails the measurement chart 500 to an administrator of the configuration device 300. The administrator controls the configuration device 300 to transmit configuration data 292 created based on the measurement chart 500 to the MFP 200. Alternatively, the MFP 200 may be provided with the configuration process unit M24 shown in FIG. 1 that possesses the same functional units as the configuration process unit M30 in the configuration device 300 of the embodiments. In this case, the flatbed scanning unit 260 of the MFP 200 may be used to measure the measurement chart 500, for example.

(3) The six types of printing methods described in the embodiments are all examples of interlaced printing methods, but various other types of printing methods may be employed. In such cases, a suitable printing method can be selected by evaluating the relationship between sub-scanning properties produced in each printing method and the generation of white streaks using the technique described in the embodiments. For example, when employing a plurality of types of printing methods that use uniform conveyance in which the target unit conveying distance is expressed by D×(k×n+b) (where D is the target line spacing, n is a natural number set based on the number of nozzles being used, k is the number of passes represented by N/D and is 3 or greater, and b is a non-zero integer that satisfies the expression −(½)k≤b≤(½)k), priority may be given to selecting a printing method producing a positive b value when the actual unit conveying distance has a statistical tendency to be greater than the target unit conveying distance and priority may be given to selecting a printing method producing a negative b value when the actual unit conveying distance has a statistical tendency to be smaller than the target unit conveying distance. Alternatively, priority may be given to selecting a printing method that produces, a large absolute value of b when the degree of error between the actual unit conveying distance and the target unit conveying distance is smaller than a prescribed reference (the value determined by the prediction interval) and to selecting a printing method that produces a smaller absolute value of b when the degree of error is greater than the prescribed reference.

(4) In the embodiments described above, the method of determining whether the actual conveying distance tends to be statistically greater than the target unit conveying distance is to compare the average measured conveying distance Lmave to the reference conveying distance La. However, other determination criteria may be used, such as a comparison between an intermediate value of the measured conveying distance Lm and the reference conveying distance La.

(5) In the embodiments described above, a prediction interval is used to determine which printing method to employ between the 8n+3 and 8n+1 methods and between the 8n−3 and 8n−1 methods, but other criteria may be used, such as a confidence interval. These criteria may involve determining whether the statistical probability of the actual conveying distance being greater than or smaller than the target unit conveying distance exceeds a prescribed probability.

(6) When property data related to a main scan changes in mid-conveyance, the printing method may be switched to respond to this change in property data. For example, the speed at which the paper P is conveyed when the paper P is clamped by both the upstream clamping unit 244 and the downstream clamping unit 245 may be different from the conveying speed of the paper P when clamped by only the downstream clamping unit 245. Accordingly, in the case of four-pass interlaced printing, the MFP 200 may be configured to print using the 4n−1 printing method while the paper P is gripped and conveyed by both the upstream clamping unit 244 and the downstream clamping unit 245 and to print using the 4n+1 printing method after the paper P separates from the upstream clamping unit 244 and is conveyed only by the downstream clamping unit 245.

(7) Part of the configuration of the invention implemented in hardware in the embodiments described above may be replaced by software and, conversely, part of the configuration of the invention implemented in software may be replaced by hardware.

What is claimed is:

1. A printing device comprising:
    a print head including a plurality of nozzles arranged in a first direction and spaced apart by a prescribed nozzle pitch, the plurality of nozzles being configured to form dots having a same color on a recording sheet;
    a scanning portion configured to perform a scan in which the scanning portion moves the print head relative to the recording sheet in the first direction;
    a head drive portion configured to drive at least one nozzle of the plurality of nozzles to form dots such that a raster line configured of the dots extends in a second direction different from the first direction; and
    a print control processor configured to perform a print operation in a resolution in which a plurality of raster lines is arranged in the first direction by a line pitch smaller than the nozzle pitch by controlling the print head, the scanning portion, and the head drive portion,
    the print control processor being configured to function as:
    a property data acquiring unit configured to acquire property data with respect to a property of the scan; and
    a print method selecting unit configured to select, based on the property data, one of a plurality of print methods, each of the plurality of print method printing, in a prescribed order, the plurality of raster lines arranged in the first direction by the line pitch, the prescribed order being specific to each of the plurality of print methods,
    wherein the print control processor is configured to perform the print operation in the resolution by using the selected one of the plurality of methods.

2. The printing device according to claim 1, wherein each of the plurality of print methods is configured to set a target unit conveying distance expressed by $D \times (k \times n + b)$, where D represents the line pitch, n represents a natural number set based on number of the at least one nozzle being used, k is a number given by N/D and is 3 or greater wherein N indicates the nozzle pitch, and b is a non-zero integer satisfying $-(\frac{1}{2})k < b < (\frac{1}{2})k$,
    wherein the plurality of print methods includes a first type method in which the value of b to specify the target unit conveying distance is a positive value and a second type method in which the value of b to specify the target unit conveying distance is a negative value,
    wherein the property includes an error between a target unit conveying distance and an actual conveying distance by which the scanning portion actually moves the print head relative to the recording sheet in the first direction when the scanning portion targets, as a moving amount, the target unit conveying distance,
    wherein the print method selecting unit selects the first type method when the actual unit conveying distance has a statistical tendency to be greater than the target unit conveying distance, whereas the print method selecting unit selects the second type method when the actual unit conveying distance has a statistical tendency to be smaller than the target unit conveying distance.

3. The printing device according to claim 2, wherein each of the first type method and the second type method includes at least two methods, wherein the absolute value of b to specify the target unit conveying distance is specific to each of the at least two methods,
    wherein the print method selecting unit selects one of the at least two methods in which the absolute value of b is larger than at least one absolute value of b in each remaining method of the at least two methods when the error is smaller than a prescribed reference, whereas the print method selecting unit selects one of the at least two methods in which the absolute value of b is smaller than at least one absolute value of b in each remaining method of the at least two methods when the error is larger than the prescribed reference.

4. The printing device according to claim 2, wherein each of the first type method and the second type method includes at least two methods, wherein the absolute value of b to specify the target unit conveying distance is specific to each of the at least two methods,
    wherein the print method selecting unit selects one of the at least two methods under a criteria that determines whether a statistical probability of the actual conveying distance being greater than the target unit conveying distance exceeds a prescribed probability or whether the statistical probability of the actual conveying distance being smaller than the target unit conveying distance exceeds the prescribed probability.

5. The printing device according to claim 1, wherein the scanning portion includes a conveying portion configured to move the recording sheet in a direction opposite to the first direction,
    wherein the property includes a property of the conveying portion that varies according to a type of the recording sheet.

6. The printing device according to claim 5, wherein the property data acquiring unit includes a sheet data acquiring unit configured to acquire sheet data to specify a type of the recording sheet,
    the printing device further includes a correlated data acquiring portion configured to acquire correlated data correlating the type of the recording sheet and at least one of the plurality of print methods,
    wherein the print method selecting unit configured to select, based on the correlated data, the print method correlated to the type of the recording sheet specified by the sheet data.

7. A method for setting a printing device including: a print head including a plurality of nozzles arranged in a first direction, spaced apart by a prescribed nozzle pitch, and configured to form dots having a same color on a recording sheet; and a scanning portion configured to perform a scan in which the scanning portion moves the print head relative to the recording sheet in the first direction; and a head drive portion configured to drive at least one nozzle of the plurality of nozzles to form dots such that a raster line configured of the dots extends in a second direction different from the first direction, the printing device being configured to repeatedly perform a unit print such that the print drive portion drives the at least one nozzle to form at least one raster line and the scan in which the scanning portion moves the print head relative to the recording sheet in the first direction, the method comprising:
(a) acquiring property data with respect to a property of the scan; and
(b) selecting, based on the property data, one of a plurality of print methods that print, in a prescribed order, a plurality of raster lines arranged in the first direction by the line pitch, the prescribed order being specific to each of the plurality of print methods.

8. The method according to claim 7, wherein the acquiring step (a) includes:
(a-1) printing a specific image by using the printing device; and
(a-2) generating the property data by using the printed specific image.

9. The method according to claim 8, wherein the printing step (a-1) prints the specific image having a plurality of raster lines by repeatedly performing the unit print to print one raster line by using one nozzle among the plurality of nozzle and the scan in which the scanning portion moves the print head relative to the recording sheet in the first direction by a prescribed distance, wherein the step (a-2) generates the property data based on a distance between the plurality of raster lines on the printed specific image.

* * * * *